US012254861B2

(12) United States Patent
Inoue et al.

(10) Patent No.: US 12,254,861 B2
(45) Date of Patent: Mar. 18, 2025

(54) ACTIVE NOISE REDUCTION SYSTEM, ACTIVE NOISE REDUCTION METHOD, AND NON-TRANSITORY COMPUTER-READABLE STORAGE MEDIUM

(71) Applicant: HONDA MOTOR CO., LTD., Tokyo (JP)

(72) Inventors: Toshio Inoue, Saitama (JP); Xun Wang, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 18/188,140

(22) Filed: Mar. 22, 2023

(65) Prior Publication Data

US 2023/0306951 A1 Sep. 28, 2023

(30) Foreign Application Priority Data

Mar. 28, 2022 (JP) ................................ 2022-051631

(51) Int. Cl.
*G10K 11/178* (2006.01)

(52) U.S. Cl.
CPC .................. *G10K 11/17881* (2018.01); *G10K 11/17817* (2018.01); *G10K 11/17819* (2018.01); *G10K 11/17823* (2018.01); *G10K 11/17825* (2018.01); *G10K 2210/12* (2013.01)

(58) Field of Classification Search
CPC .................... G10K 11/17881; G10K 11/17823
See application file for complete search history.

(56) References Cited

U.S. PATENT DOCUMENTS

2015/0256928 A1* 9/2015 Mizuno ................ G01S 15/325
381/56

FOREIGN PATENT DOCUMENTS

JP H0728474 A 1/1995

* cited by examiner

*Primary Examiner* — Ping Lee
(74) *Attorney, Agent, or Firm* — Armstrong Teasdale LLP

(57) ABSTRACT

An active noise reduction system includes a canceling sound output device configured to output a canceling sound, a plurality of noise microphones configured to generate a plurality of noise signals based on a noise, and a controller configured to control the canceling sound output device based on the plurality of noise signals, wherein the controller is configured to acquire the plurality of noise signals output from the plurality of noise microphones, select a reference signal and an error signal from among the plurality of noise signals, the reference signal corresponding to the noise, the error signal corresponding to an error between the noise and the canceling sound, generate a correction reference signal by removing a component of the canceling sound from the reference signal, and generate a control signal based on the correction reference signal, the control signal being a signal for controlling the canceling sound output device.

10 Claims, 9 Drawing Sheets

ACTIVE NOISE REDUCTION SYSTEM, ACTIVE NOISE REDUCTION METHOD, AND NON-TRANSITORY COMPUTER-READABLE STORAGE MEDIUM

TECHNICAL FIELD

The present invention relates to an active noise reduction system, an active noise reduction method, and a non-transitory computer-readable storage medium that reduce a noise by causing a canceling sound in an opposite phase to the noise to interfere with the noise.

BACKGROUND ART

Conventionally, an active noise reduction system reduces a noise by causing a canceling sound in an opposite phase to the noise to interfere with the noise.

For example, JPH7-28474A discloses an active noise reduction system (noise canceling system) including a speaker that outputs a canceling sound, an acceleration sensor that generates a signal corresponding to a noise, an error microphone that detects a synthesized sound of the noise and the canceling sound and outputs a signal of the synthesized sound, and an adaptive signal processing unit that controls the speaker based on the signals from the acceleration sensor and the error microphone.

In the above conventional technique, the acceleration sensor that generates the signal corresponding to the noise is, in general, a relatively expensive component. Accordingly, if the signal corresponding to the noise is generated by the acceleration sensor, the active noise reduction system may become expensive.

SUMMARY OF THE INVENTION

In view of the above background, an object of the present invention is to provide an inexpensive active noise reduction system that can effectively reduce a noise.

To achieve such an object, one aspect of the present invention provides an active noise reduction system (11) comprising: a canceling sound output device (12A-12D) configured to output a canceling sound for canceling a noise; a plurality of noise microphones (13A-13E) configured to generate a plurality of noise signals based on the noise; and a controller (16) configured to control the canceling sound output device based on the plurality of noise signals, wherein the controller is configured to: acquire the plurality of noise signals output from the plurality of noise microphones; select a reference signal and an error signal from among the plurality of noise signals, the reference signal corresponding to the noise, the error signal corresponding to an error between the noise and the canceling sound; generate a correction reference signal by removing a component of the canceling sound from the reference signal; and generate a control signal based on the correction reference signal, the control signal being a signal for controlling the canceling sound output device.

According to this aspect, both the reference signal and the error signal can be generated by using the plurality of noise microphones. Accordingly, it is not necessary to use an expensive sensor such as an acceleration sensor to generate the reference signal, so that an inexpensive active noise reduction system can be provided. Moreover, even if the component of the canceling sound is mixed in the reference signal, the component of the canceling sound can be removed from the reference signal. Accordingly, an appropriate control signal can be generated based on the original reference signal in which the component of the canceling sound is not mixed, so that the noise can be effectively reduced.

In the above aspect, preferably, the controller is configured to: extract components of the correction reference signal at a plurality of frequencies by using a plurality of extraction filters (A); generate components of the control signal at the plurality of frequencies from the components of the correction reference signal at the plurality of frequencies by using a plurality of control filters (W); and generate the control signal by adding together the components of the control signal at the plurality of frequencies.

According to this aspect, by generating the control signal based on the components of the control signal at the plurality of frequencies, the noise can be effectively reduced in a wide frequency band.

In the above aspect, preferably, the plurality of extraction filters and the plurality of control filters are composed of adaptive notch filters.

According to this aspect, the calculation load of the controller can be reduced. Accordingly, it is not necessary to form the controller by a high-performance processor, so that the active noise reduction system can be provided at a lower cost.

In the above aspect, preferably, the controller is configured to: acquire an audio signal output from an audio source (14); generate a correction error signal by removing a component of the audio signal from the error signal; and adaptively update a control filter based on the correction error signal, the control filter being a filter for generating the control signal.

According to this aspect, even if the component of the audio signal (for example, the component of music or navigation audio played based on the audio signal) is mixed in the error signal, the component of the audio signal can be removed from the error signal. Accordingly, the control filter can be appropriately updated based on the original error signal in which the component of the audio signal is not mixed, so that the noise can be reduced effectively. Furthermore, the sound quality of music or navigation audio played based on the audio signal is less likely to be affected by the control executed by the controller.

In the above aspect, preferably, the plurality of noise microphones includes a reference microphone (13*r*) configured to generate the reference signal and an error microphone (13*e*) configured to generate the error signal, and the controller is configured to: adaptively update an estimation value of transfer characteristics from the canceling sound output device to the error microphone; and generate the correction error signal based on the updated estimation value of the transfer characteristics from the canceling sound output device to the error microphone.

According to this aspect, even if the transfer characteristics from the canceling sound output device to the error microphone change according to the change in the environment of the error microphone (for example, the change over the years in the state of a space where the error microphone is arranged, the change in the opening/closing state of a window near the error microphone, or the change in the position of a seat where the error microphone is arranged), this change can be learned and an appropriate correction error signal can be generated. Accordingly, the noise can be reduced more effectively.

In the above aspect, preferably, the plurality of noise microphones includes a reference microphone (13*r*) configured to generate the reference signal and an error microphone (13$e$) configured to generate the error signal, and the controller is configured to: adaptively update an estimation value of transfer characteristics from the canceling sound output device to the error microphone; and adaptively update a control filter based on the updated estimation value of the transfer characteristics from the canceling sound output device to the error microphone, the control filter being a filter for generating the control signal.

According to this aspect, even if the transfer characteristics from the canceling sound output device to the error microphone change according to the change in the environment of the error microphone, this change can be learned and the control filter can be updated appropriately. Accordingly, the noise can be reduced more effectively.

In the above aspect, preferably, the plurality of noise microphones includes a reference microphone (13$r$) configured to generate the reference signal and an error microphone (13$e$) configured to generate the error signal, and the controller is configured to: adaptively update an estimation value of transfer characteristics from the canceling sound output device to the reference microphone; and remove the component of the canceling sound from the reference signal based on the updated estimation value of the transfer characteristics from the canceling sound output device to the reference microphone.

According to this aspect, even if the transfer characteristics from the canceling sound output device to the reference microphone change according to the change in the environment of the reference microphone (for example, the change over the years in the state of a space where the reference microphone is arranged, the change in the opening/closing state of a window arranged near the reference microphone, or the change in the position of a seat where the reference microphone is arranged), this change can be learned and the component of the canceling sound can be appropriately removed from the reference signal. Accordingly, the noise can be reduced more effectively.

In the above aspect, preferably, the canceling sound output device (142) and the plurality of noise microphones (143A-143H) are arranged in an occupant seat (6) of a vehicle (1), and the controller (144) is installed in a portable terminal (146) configured to be taken outside the vehicle.

According to this aspect, the occupant seat and the portable terminal can compose the noise reduction system. Accordingly, the noise reduction system can be easily added to an existing vehicle and easily replaced. Further, by linking the occupant seat and the portable terminal, an appropriate noise reduction effect can be acquired for each occupant.

To achieve the abovementioned object, one aspect of the present invention provides an active noise reduction method comprising: acquiring a plurality of noise signals output from a plurality of noise microphones; selecting a reference signal and an error signal from among the plurality of noise signals, the reference signal corresponding to a noise, the error signal corresponding to an error between the noise and a canceling sound; generating a correction reference signal by removing a component of the canceling sound from the reference signal; and generating a control signal based on the correction reference signal, the control signal being a signal for controlling the canceling sound.

To achieve the abovementioned object, one aspect of the present invention provides a non-transitory computer-readable storage medium (16$b$) comprising an active noise reduction program, wherein the active noise reduction program, when executed by a processor (16$a$), executes an active noise reduction method comprising: acquiring a plurality of noise signals output from a plurality of noise microphones; selecting a reference signal and an error signal from among the plurality of noise signals, the reference signal corresponding to a noise, the error signal corresponding to an error between the noise and a canceling sound; generating a correction reference signal by removing a component of the canceling sound from the reference signal; and generating a control signal based on the correction reference signal, the control signal being a signal for controlling the canceling sound.

According to this aspect, both the reference signal and the error signal can be generated by using the plurality of noise microphones. Accordingly, it is not necessary to use an expensive sensor such as an acceleration sensor to generate the reference signal, so that an inexpensive active noise reduction method can be provided and the storage medium can be applied to an inexpensive active noise reduction system. Moreover, even if the component of the canceling sound is mixed in the reference signal, the component of the canceling sound can be removed from the reference signal. Accordingly, an appropriate control signal can be generated based on the original reference signal in which the component of the canceling sound is not mixed, so that the noise can be effectively reduced.

Thus, according to the above aspects, it is possible to provide an inexpensive active noise reduction system that can effectively reduce a noise.

BRIEF DESCRIPTION OF THE DRAWING(S)

DETAILED DESCRIPTION OF THE INVENTION

Figure 1:
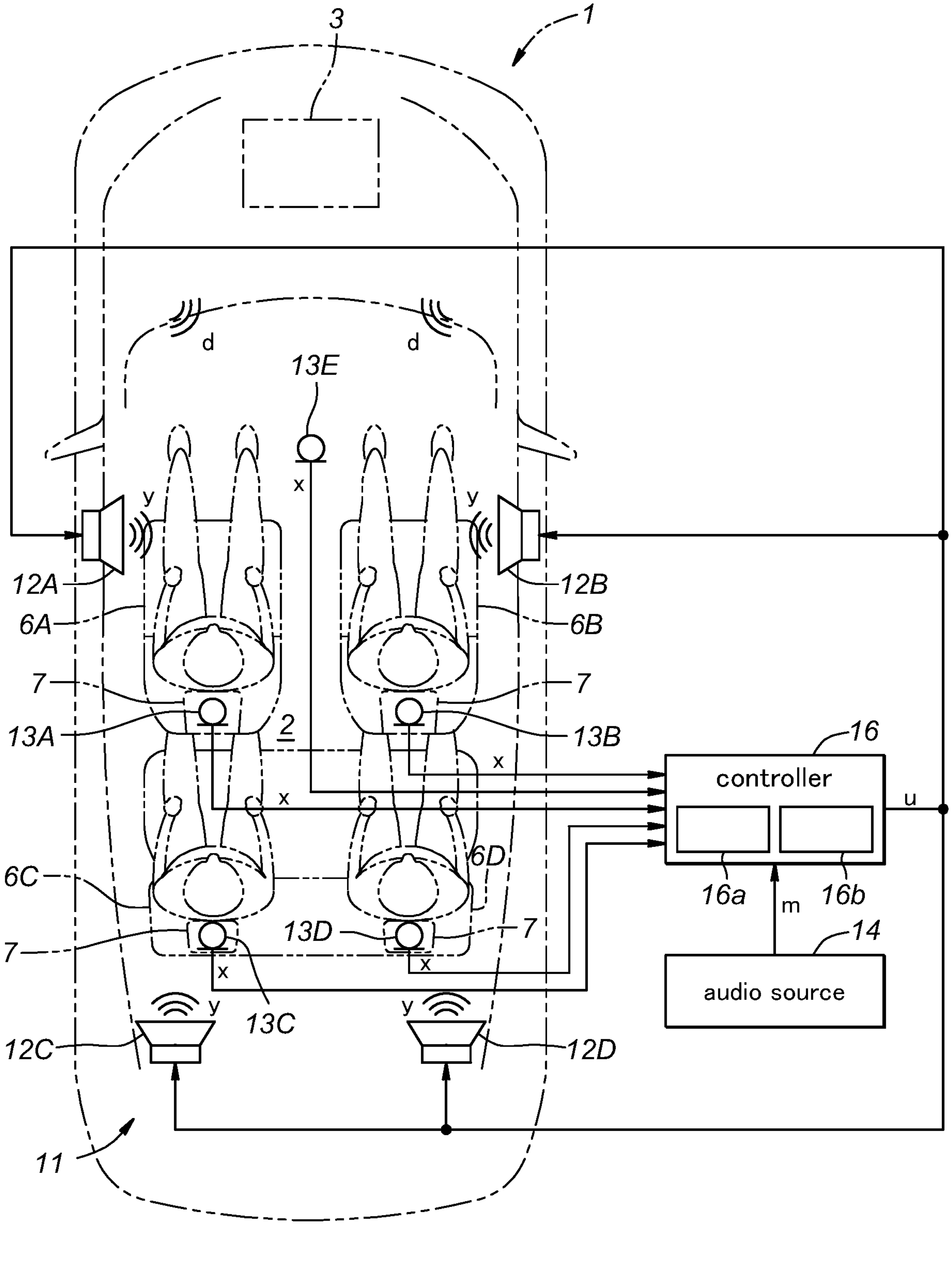
FIG. 1 is a schematic diagram showing a vehicle to which an active noise reduction system according to the first embodiment is applied.

In the following, embodiments of the present invention will be described with reference to the drawings. In this specification, "^" (circumflexes) shown together with symbols each indicate an identification value or an estimation value. "^" are shown above the symbols in the drawings and formulas, but are shown subsequently to the symbols in the text of the description.

The First Embodiment

First, the first embodiment of the present invention will be described with reference to FIGS. 1 to 3.

<The Active Noise Reduction System 11>

FIG. 1 is a schematic diagram showing a vehicle 1 to which an active noise reduction system 11 (hereinafter abbreviated as "noise reduction system 11") according to the first embodiment is applied. The noise reduction system 11 is an active noise control device (ANC device) for reducing a noise d generated in a vehicle cabin 2 of the vehicle 1. More specifically, the noise reduction system 11 reduces the noise d by generating a canceling sound y in an opposite phase to the noise d and causing the generated canceling sound y to interfere with the noise d.

For example, the noise d to be reduced by the noise reduction system 11 is a road noise caused by the vibrations of wheels due to the force from a road surface. The noise d to be reduced by the noise reduction system 11 may be a noise other than the road noise (for example, a driving noise caused by the vibrations of a driving source 3 such as an internal combustion engine or an electric motor).

Figure 2:
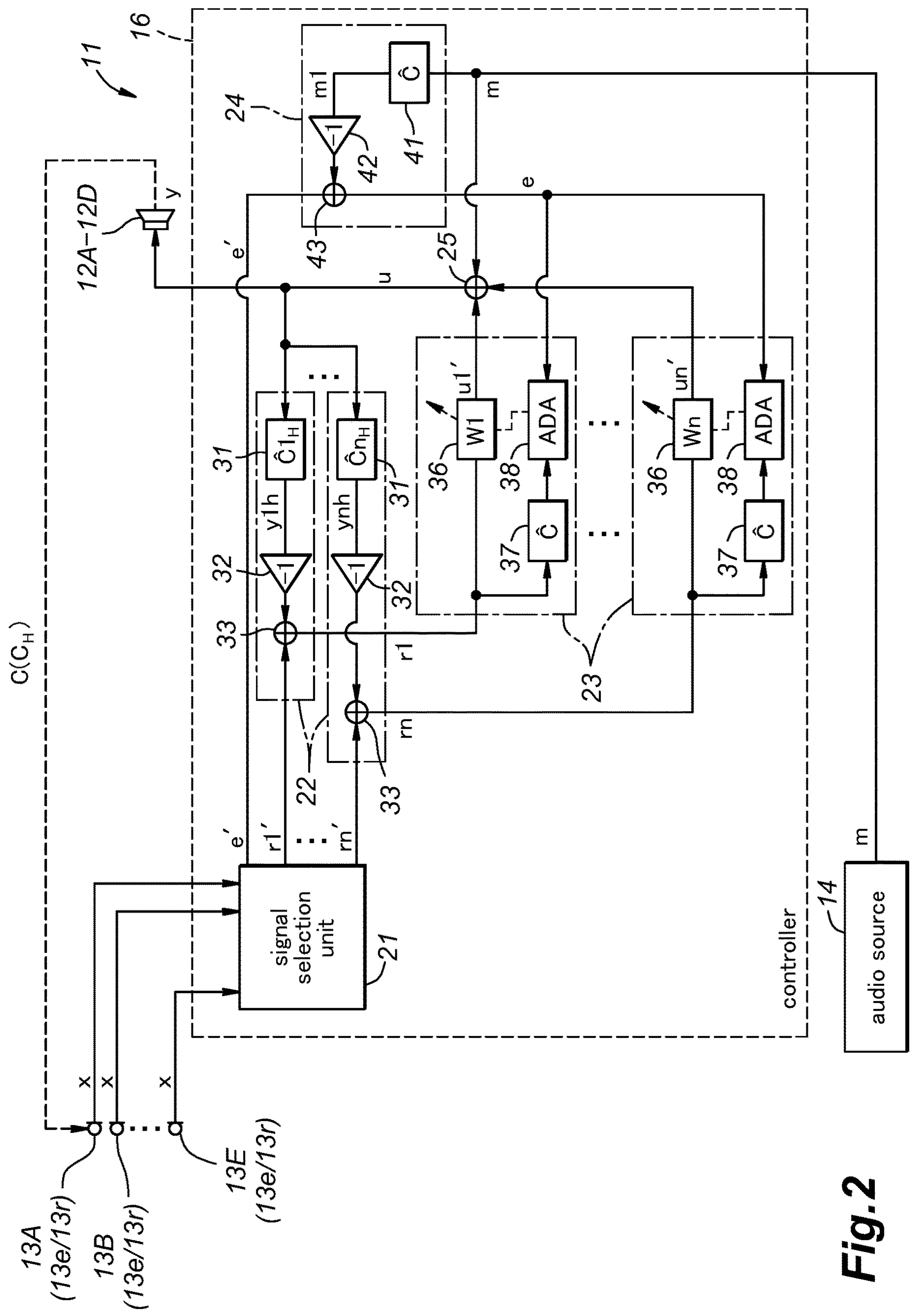
FIG. 2 is a functional block diagram showing the active noise reduction system according to the first embodiment.

With reference to FIGS. 1 and 2, the noise reduction system 11 includes a plurality of speakers 12A-12D (an example of a canceling sound output device) configured to output the canceling sound y for canceling the noise d, a plurality of noise microphones 13A-13E configured to generate a plurality of noise signals x based on the noise d, an audio source 14 configured to output an audio signal m, and a controller 16 configured to control the speakers 12A-12D based on the noise signals x and the audio signal m.

<The Speakers 12A-12D>

The speakers 12A-12D of the noise reduction system 11 are arranged at positions corresponding to a plurality of occupant seats 6A-6D provided in the vehicle 1. For example, the speakers 12A, 12B are arranged in doors on both lateral sides of the front occupant seats 6A, 6B, and the speakers 12C, 12D are arranged behind the rear occupant seats 6C, 6D.

<The Noise Microphones 13A-13E>

The noise microphones 13A-13E of the noise reduction system 11 are arranged at any positions of the vehicle 1. For example, the noise microphones 13A-13D are arranged at the positions corresponding to the occupant seats 6A-6D. More specifically, the noise microphones 13A-13D are arranged in headrests 7 of the occupant seats 6A-6D. For example, the noise microphone 13E is arranged near a noise source.

<The Audio Source 14>

The audio source 14 of the noise reduction system 11 consists of, for example, a hard disk or compact disc on which music information is recorded. The audio source 14 generates the audio signal m (for example, a music signal) according to an input operation by an occupant. The audio source 14 outputs the generated audio signal m to the controller 16.

<The Controller 16>

With reference to FIG. 1, the controller 16 of the noise reduction system 11 consists of a computer including a processing device 16*a* (a processor such as CPU, MPU, or the like) and a storage device 16*b* (memory such as ROM, RAM, or the like). The processing device 16*a* is an example of a processor, and the storage device 16*b* is an example of a non-transitory computer-readable storage medium. The controller 16 may consist of one piece of hardware, or may consist of a unit composed of plural pieces of hardware.

The controller 16 includes, as functional components, a signal selection unit 21, n (n≥2) pieces of howl removal units 22, n pieces of control signal output units 23, an audio signal removal unit 24, and an adder 25. In another embodiment, the controller 16 may have only one howl removal unit 22 and only one control signal output unit 23. The numbers of howl removal units 22 and control signal output units 23 are freely determined according to the number of channels of the reference signals r' described later.

<The Signal Selection Unit 21>

The signal selection unit 21 of the controller 16 is connected to the noise microphones 13A-13E and acquires the noise signals x output from the noise microphones 13A-13E. The signal selection unit 21 selects n pieces of reference signals r' (r1', . . . , rn') and an error signal e' from among the noise signals x. The n pieces reference signals r' correspond to the noise d itself. The error signal e' corresponds to an error between the noise d and the canceling sound y. The signal selection unit 21 outputs the selected reference signals r' to the howl removal units 22 and outputs the selected error signal e' to the audio signal removal unit 24.

The signal selection unit 21 may select the error signal e' and the reference signals r' from the noise signals x based on the positions of the speakers 12A-12D to be controlled. For example, in controlling the speaker 12A corresponding to the occupant seat 6A, the signal selection unit 21 may select the noise signal x output from the noise microphone 13A corresponding to the occupant seat 6A as the error signal e', and select the noise signals x output from the noise microphones 13B-13E other than the noise microphone 13A as the reference signals r'. On the other hand, in controlling the speaker 12B corresponding to the occupant seat 6B, the signal selection unit 21 may select the noise signal x output from the noise microphone 13B corresponding to the occupant seat 6B as the error signal e', and select the noise signals x output from the noise microphones 13A, 13C-13E other than the noise microphone 13B as the reference signals r'.

As described above, the noise signal x output from the noise microphone 13A is selected as the error signal e' in the control of the speaker 12A, and is selected as the reference signal r' in the control of the speaker 12B. The control of the speaker 12A and the control of the speaker 12B are executed simultaneously. Accordingly, the noise signal x output from the noise microphone 13A is used simultaneously as the error signal e' and the reference signal r' (similar logic can be applied to the noise signals x output from the noise microphones 13B-13E).

Hereinafter, the noise microphones 13A-13E that generate the reference signals r' will be referred to as "the reference microphones 13*r*". The noise microphones 13A-13E that generate the error signal e' will be referred to as "the error microphones 13*e*". As is clear from the above description, the noise microphones 13A-13E are used simultaneously as the reference microphone 13*r* and the error microphone 13*e*. A symbol C in FIG. 2 indicates transfer characteristics of the canceling sound y from each speaker 12A-12D to the error microphones 13*e* (transfer characteristics of a secondary path), and a symbol $C_H$ in FIG. 2 indicates transfer characteristics of the canceling sound y from each speaker 12A-12D to the reference microphones 13*r*. Symbols "ADA" in each figure (for example, FIG. 2) indicate "adaptive".

<The Howl Removal Units 22>

Each howl removal unit 22 of the controller 16 includes a howl filter unit 31, a polarity reversing unit 32, and an adder 33.

The howl filter unit 31 consists of a howl filter $\hat{C}_H$ ($\hat{C}\mathbf{1}_H$, . . . , $\hat{C}n_H$). The howl filter $\hat{C}_H$ is a filter corresponding to an estimation value of the transfer characteristics $C_H$ of the canceling sound y from each speaker 12A-12D to the reference microphone 13*r*. A finite impulse response filter (FIR filter) or a single-frequency adaptive notch filter (SAN filter) may be used for the howl filter $\hat{C}_H$. In the present embodiment, the coefficients of the howl filter $\hat{C}_H$ are fixed values measured in advance.

The howl filter unit 31 generates a howl signal yh (y1*h*, . . . , ynh) by filtering a control signal u (that will be described later) output from the adder 25. The howl signal yh is a signal corresponding to a component of the canceling sound y (more specifically, a component of the canceling sound y that is transmitted from each speaker 12A-12D to the reference microphones 13*r*). The howl filter unit 31 outputs the generated howl signal yh to the polarity reversing unit 32.

The polarity reversing unit 32 reverses the polarity of the howl signal yh output from the howl filter unit 31. The polarity reversing unit 32 outputs the howl signal yh with a reversed polarity to the adder 33.

The adder 33 generates a correction reference signal r (r1, . . . , rn) by adding together the reference signal r' output from the signal selection unit 21 and the howl signal yh output from the polarity reversing unit 32. The correction reference signal r is represented by the following formula (1). Incidentally, "*" in the following formula (1) indicates a convolution operation.

$$r=r'-yh=r'-u*\hat{C}_H \quad (1)$$

As is clear from the above formula (1), the correction reference signal r is a signal acquired by removing the component of the canceling sound y from the reference signal r'. The adder 33 outputs the generated correction reference signal r to the corresponding control signal output unit 23.

<The Control Signal Output Units 23>

Each control signal output unit 23 of the controller 16 corresponds to the correction reference signal r (r1, . . . , rn). The control signal output unit 23 includes a control filter unit 36, a first secondary path filter unit 37, and a control update unit 38.

The control filter unit 36 consists of a control filter W (W1, . . . , Wn). An FIR filter or a SAN filter may be used for the control filter W. The control filter unit 36 generates a control signal component u' (u1', . . . , un') by filtering the correction reference signal r. The control filter unit 36 outputs the generated control signal component u' to the adder 25.

The first secondary path filter unit 37 consists of a secondary path filter $\hat{C}$. The secondary path filter $\hat{C}$ is a filter corresponding to an estimation value of the transfer characteristics C of the canceling sound y from each speaker 12A-12D to the error microphones 13*e*. An FIR filter or a SAN filter may be used for the secondary path filter $\hat{C}$. The first secondary path filter unit 37 filters the correction reference signal r, and outputs the filtered correction reference signal r to the control update unit 38.

The control update unit 38 adaptively updates the control filter W using an adaptive algorithm such as a Least Mean Square algorithm (LMS algorithm). More specifically, the control update unit 38 updates the control filter W such that a correction error signal output from the audio signal removal unit 24 is minimized.

<The Audio Signal Removal Unit 24>

The audio signal removal unit 24 of the controller 16 includes a second secondary path filter unit 41, a polarity reversing unit 42, and an adder 43.

The second secondary path filter unit 41 consists of the secondary path filter $\hat{C}$. The second secondary path filter unit 41 generates an audio signal m1 by filtering the audio signal m output from the audio source 14. The second secondary path filter unit 41 outputs the generated audio signal m1 to the polarity reversing unit 42.

The polarity reversing unit 42 reverses the polarity of the audio signal m1 output from the second secondary path filter unit 41. The polarity reversing unit 42 outputs the audio signal m1 with a reversed polarity to the adder 43.

The adder 43 generates the correction error signal e by adding together the error signal e' output from the signal selection unit 21 and the audio signal m1 that has passed through the polarity reversing unit 42. The correction error signal e is represented by the following formula (2).

$$e=e'-m1=e'-m*\hat{C} \quad (2)$$

As is clear from the above formula (2), the correction error signal e is a signal acquired by removing the component of the audio signal m from the error signal e'.

<The Adder 25>

The adder 25 of the controller 16 generates the control signal u for controlling the speakers 12A-12D by adding together the control signal components u' output from the plurality of control signal output units 23 and the audio signal m output from the audio source 14. The adder 25 outputs the generated control signal u to the speakers 12A-12D and the howl removal units 22. Accordingly, the speakers 12A-12D output the canceling sound y corresponding to the control signal u.

<The Effect of the First Embodiment>

The controller 16 acquires the noise signals x output from the noise microphones 13A-13E, and selects the reference signals r' and the error signal e' from the noise signals x. In other words, the active noise reduction program stored in the storage device 16*b*, when executed by the processing device 16*a*, executes an active noise reduction method described above. Thus, both the reference signals r' and the error signal e' can be generated by using the noise microphones 13A-13E. Accordingly, it is not necessary to use an expensive sensor such as an acceleration sensor to generate the reference signals r', so that an inexpensive noise reduction system 11 can be provided.

By the way, the canceling sound y output from each speaker 12A-12D reaches not only the error microphones 13*e* but also the reference microphones 13*r*. Accordingly, the component of the canceling sound y may be mixed in the reference signal r'. If the control signal u is generated based on the reference signal r' in which the component of the canceling sound y is mixed, a howl phenomenon may occur.

As such, the controller 16 generates the correction reference signal r by removing the component of the canceling sound y from the reference signal r', and thus generates the control signal u based on the correction reference signal r. In other words, the active noise reduction program stored in the storage device 16*b*, when executed by the processing device 16*a*, executes an active noise reduction method described above. Thus, the influence of the canceling sound y mixed in the reference signal r' can be eliminated. Accordingly, an appropriate control signal u can be generated based on the original reference signal r' in which the component of the canceling sound y is not mixed, so that the noise d can be reduced effectively.

Further, if the component of the canceling sound y is removed from the noise signal x, the noise signal x can be used as the reference signal r'. On the other hand, if the component of the canceling sound y is not removed from the noise signal x, the noise signal x can be used as the error signal e'. That is, the noise signal x used as the reference signal r' in one control channel can be used as the error signal e' in another control channel.

Figure 3:
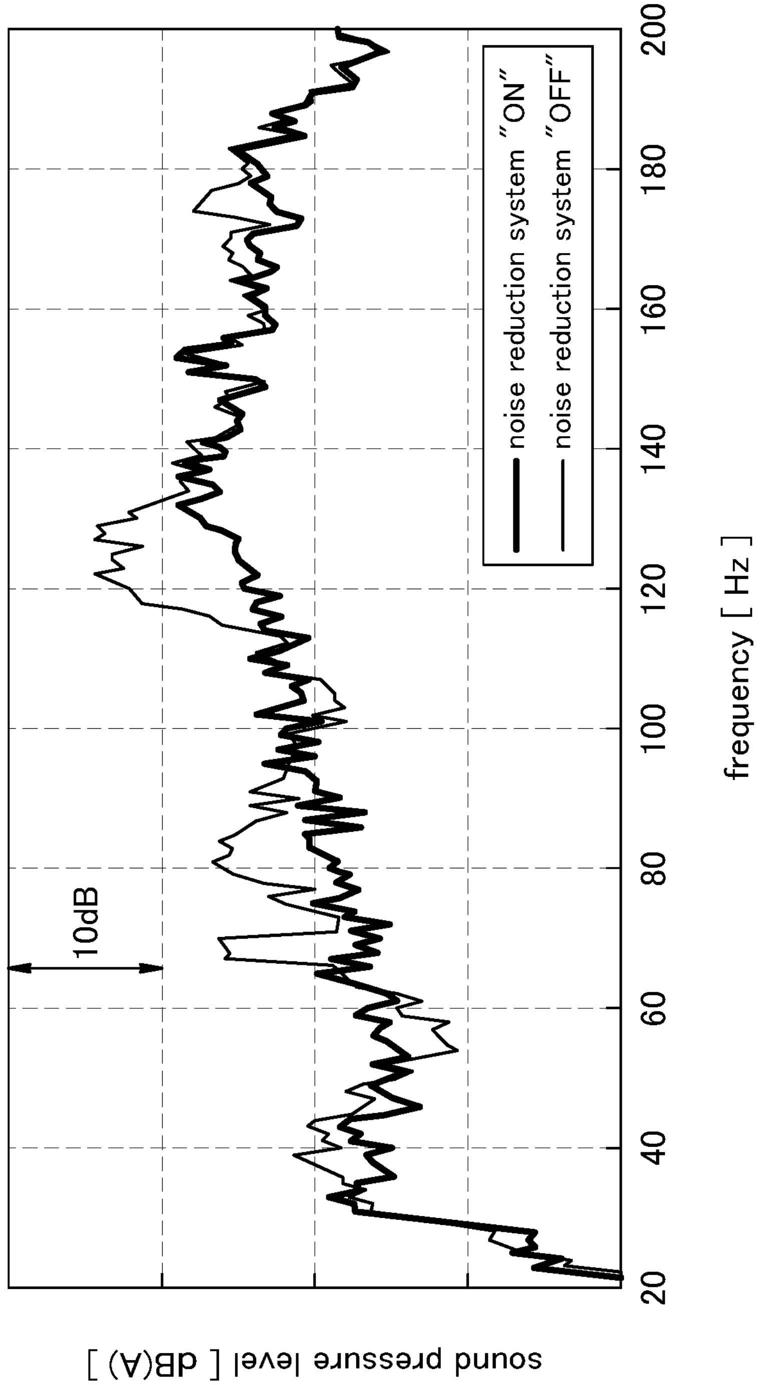
FIG. 3 is a graph showing the effect of reducing a noise.

FIG. 3 is a graph showing the effect of reducing the noise d. As shown in FIG. 3, in a case where the noise reduction system 11 is ON, the noise d can be effectively reduced as compared with a case where the noise reduction system 11 is OFF.

<The Modification of the First Embodiment>

In the first embodiment, the controller 16 includes the audio signal removal unit 24. In another embodiment, the audio signal removal unit 24 may be omitted if the audio signal m has a small effect on the error signal e'.

The Second Embodiment

Next, the second embodiment of the present invention will be described with reference to FIG. 4. Explanations that overlap with those of the first embodiment of the present invention will be omitted as appropriate.

<The Active Noise Reduction System 51>

Figure 4:
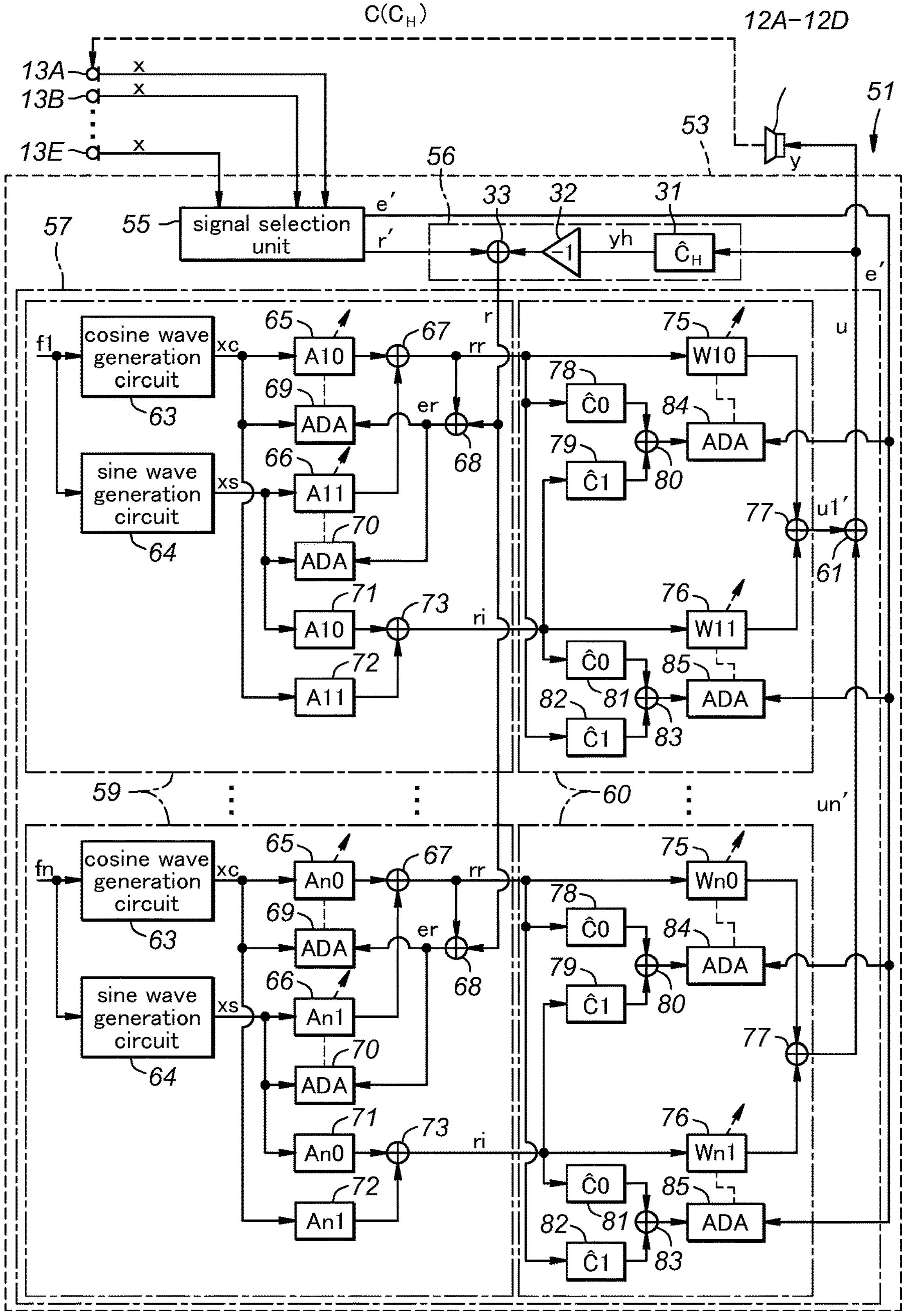
FIG. 4 is a functional block diagram showing an active noise reduction system according to the second embodiment.

FIG. 4 is a functional block diagram showing an active noise reduction system 51 (hereinafter abbreviated as "noise reduction system 51") according to the second embodiment. In the noise reduction system 51 according to the second embodiment, the elements other than the controller 53 are the same as those of the noise reduction system 11 according to the first embodiment. Accordingly, descriptions of these components will be omitted.

<The Controller 53>

The controller 53 includes, as functional components, a signal selection unit 55, a single howl removal unit 56, and a single control signal output unit 57. In another embodiment, the controller 53 may include a plurality of howl removal units 56 and a plurality of control signal output units 57. The configurations of the signal selection unit 55 and the howl removal unit 56 are the same as those of the signal selection unit 21 and the howl removal unit 22 according to the first embodiment. Accordingly, descriptions of these components will be omitted.

<The Control Signal Output Unit 57>

The control signal output unit 57 includes n ($n \geq 2$) pieces of reference signal component extraction units 59, n pieces of control signal component generation units 60, and an adder 61.

<The Reference Signal Component Extraction Units 59>

Each reference signal component extraction unit 59 extracts the components (hereinafter referred to as "the reference signal components rr, ri") of the correction reference signal r at a prescribed extraction frequency fn based on the correction reference signal r output from the howl removal unit 56. The extraction frequency fn is set to a different value for each reference signal component extraction unit 59. The extraction frequency fn may be set to a frequency that can be the peak frequency of the noise d.

Each reference signal component extraction unit 59 consists of an extraction filter A (A1, . . . , An). A SAN filter is used for the extraction filter A. Each reference signal component extraction unit 59 includes a cosine wave generation circuit 63, a sine wave generation circuit 64, a first extraction filter unit 65, a second extraction filter unit 66, a first adder 67, a second adder 68, a first extraction update unit 69, a second extraction update unit 70, a third extraction filter unit 71, a fourth extraction filter unit 72, and a third adder 73.

The cosine wave generation circuit 63 generates a cosine wave signal xc corresponding to the extraction frequency fn. The sine wave generation circuit 64 generates a sine wave signal xs corresponding to the extraction frequency fn.

The first extraction filter unit 65 has an extraction filter coefficient A0 (A10, . . . , An0). The extraction filter coefficient A0 forms a real part of the coefficients of the extraction filter A. The first extraction filter unit 65 filters the cosine wave signal xc output from the cosine wave generation circuit 63.

The second extraction filter unit 66 has an extraction filter coefficient A1 (A11, . . . , An1). The extraction filter coefficient A1 forms an imaginary part of the coefficients of the extraction filter A. The second extraction filter unit 66 filters the sine wave signal xs output from the sine wave generation circuit 64.

The first adder 67 generates the reference signal component rr by adding together the cosine wave signal xc that has passed through the first extraction filter unit 65 and the sine wave signal xs that has passed through the second extraction filter unit 66. The first adder 67 outputs the generated reference signal component rr to the second adder 68 and the corresponding control signal component generation unit 60.

The second adder 68 generates a virtual error signal er by adding together the reference signal component rr output from the first adder 67 and the correction reference signal r. The second adder 68 outputs the generated virtual error signal er to the first extraction update unit 69 and the second extraction update unit 70.

The first extraction update unit 69 adaptively updates the extraction filter coefficient A0 using an adaptive algorithm such as the LMS algorithm. More specifically, the first extraction update unit 69 updates the extraction filter coefficient A0 such that the virtual error signal er output from the second adder 68 is minimized.

The second extraction update unit 70 adaptively updates the extraction filter coefficient A1 using an adaptive algorithm such as the LMS algorithm. More specifically, the second extraction update unit 70 updates the extraction filter coefficient A1 such that the virtual error signal er output from the second adder 68 is minimized.

The third extraction filter unit 71 has the extraction filter coefficient A0. The third extraction filter unit 71 filters the sine wave signal xs output from the sine wave generation circuit 64.

The fourth extraction filter unit 72 has the extraction filter coefficient A1. The fourth extraction filter unit 72 filters the cosine wave signal xc output from the cosine wave generation circuit 63.

The third adder 73 generates the reference signal component ri by adding together the sine wave signal xs that has passed through the third extraction filter unit 71 and the cosine wave signal xc that has passed through the fourth extraction filter unit 72. The third adder 73 outputs the generated reference signal component ri to the corresponding control signal component generation unit 60.

<The Control Signal Component Generation Units 60>

The control signal component generation units 60 correspond one-to-one to the reference signal component extraction units 59. Each control signal component generation unit 60 generates a component u' (u1', . . . , un': hereinafter referred to as "control signal component u") of the control signal u at the extraction frequency fn based on the reference signal components rr, ri output from the reference signal component extraction unit 59.

Each control signal component generation unit 60 consists of a control filter W and a secondary path filter C^. SAN filters are used for the control filter W and the secondary path filter C^. The control signal component generation unit 60 includes a first control filter unit 75, a second control filter unit 76, a first adder 77, a first secondary path filter unit 78, a second secondary path filter unit 79, a second adder 80, a third secondary path filter unit 81, a fourth secondary path filter unit 82, a third adder 83, a first control update unit 84, and a second control update unit 85.

The first control filter unit 75 has a control filter coefficient W0 (W10, . . . , Wn0). The control filter coefficient W0 forms a real part of the coefficients of the control filter W. The first control filter unit 75 filters the reference signal component rr output from the reference signal component extraction unit 59.

The second control filter unit 76 has a control filter coefficient W1 (W11, . . . , Wn1). The control filter coefficient W1 forms an imaginary part of the coefficients of the control filter W. The second control filter unit 76 filters the reference signal component ri output from the reference signal component extraction unit 59.

The first adder 77 generates the control signal component u' by adding together the reference signal component rr that has passed through the first control filter unit 75 and the reference signal component ri that has passed through the second control filter unit 76. The first adder 77 outputs the generated control signal component u' to the adder 61.

The first secondary path filter unit 78 has a secondary path filter coefficient $\hat{C}$0. The secondary path filter coefficient $\hat{C}$0 forms a real part of the coefficients of the secondary path filter $\hat{C}$. The first secondary path filter unit 78 filters the reference signal component rr output from the reference signal component extraction unit 59.

The second secondary path filter unit 79 has a secondary path filter coefficient CAL The secondary path filter coefficient $\hat{C}$1 forms an imaginary part of the coefficients of the secondary path filter $\hat{C}$. The second secondary path filter unit 79 filters the reference signal component ri output from the reference signal component extraction unit 59.

The second adder 80 generates a reference signal component rr, ri by adding together the reference signal component rr that has passed through the first secondary path filter unit 78 and the reference signal component ri that has passed through the second secondary path filter unit 79. The second adder 80 outputs the reference signal component rr, ri to the first control update unit 84.

The third secondary path filter unit 81 has the secondary path filter coefficient $\hat{C}$0. The third secondary path filter unit 81 filters the reference signal component ri output from the reference signal component extraction unit 59.

The fourth secondary path filter unit 82 has the secondary path filter coefficient $\hat{C}$1. The fourth secondary path filter unit 82 filters the reference signal component rr output from the reference signal component extraction unit 59.

The third adder 83 generates a reference signal component rr, ri by adding together the reference signal component ri that has passed through the third secondary path filter unit 81 and the reference signal component rr that has passed through the fourth secondary path filter unit 82. The third adder 83 outputs the reference signal component rr, ri to the second control update unit 85.

The first control update unit 84 updates the control filter coefficient W0 using an adaptive algorithm such as the LMS algorithm. More specifically, the first control update unit 84 updates the control filter coefficient W0 such that the error signal e' output from the signal selection unit 55 is minimized.

The second control update unit 85 updates the control filter coefficient W1 using an adaptive algorithm such as the LMS algorithm. More specifically, the second control update unit 85 updates the control filter coefficient W1 such that the error signal e' output from the signal selection unit 55 is minimized.

<The Adder 61>

The adder 61 generates the control signal u by adding together the control signal components u' output from the plurality of control signal component generation units 60. The adder 61 outputs the generated control signal u to the speakers 12A-12D and the howl removal unit 56.

<The Effect of the Second Embodiment>

The controller 53 extracts the reference signal components rr, ri at the plurality of extraction frequencies fn using the plurality of extraction filters A, generates the control signal components u' at the plurality of extraction frequencies fn from the reference signal components rr, ri at the plurality of extraction frequencies fn using the plurality of control filters W, and generates the control signal u by adding together the control signal components u' at the plurality of extraction frequencies fn. Thus, the noise d can be reduced effectively in a wide frequency band.

Further, the plurality of extraction filters A, the plurality of control filters W, and the plurality of secondary path filters $\hat{C}$ are composed of single-frequency adaptive notch filters (SAN filters). Thus, the calculational load of the controller 53 can be reduced. Accordingly, it is not necessary to form the controller 53 by a high-performance processor, so that an inexpensive noise reduction system 51 can be provided.

The Third Embodiment

Figure 5:
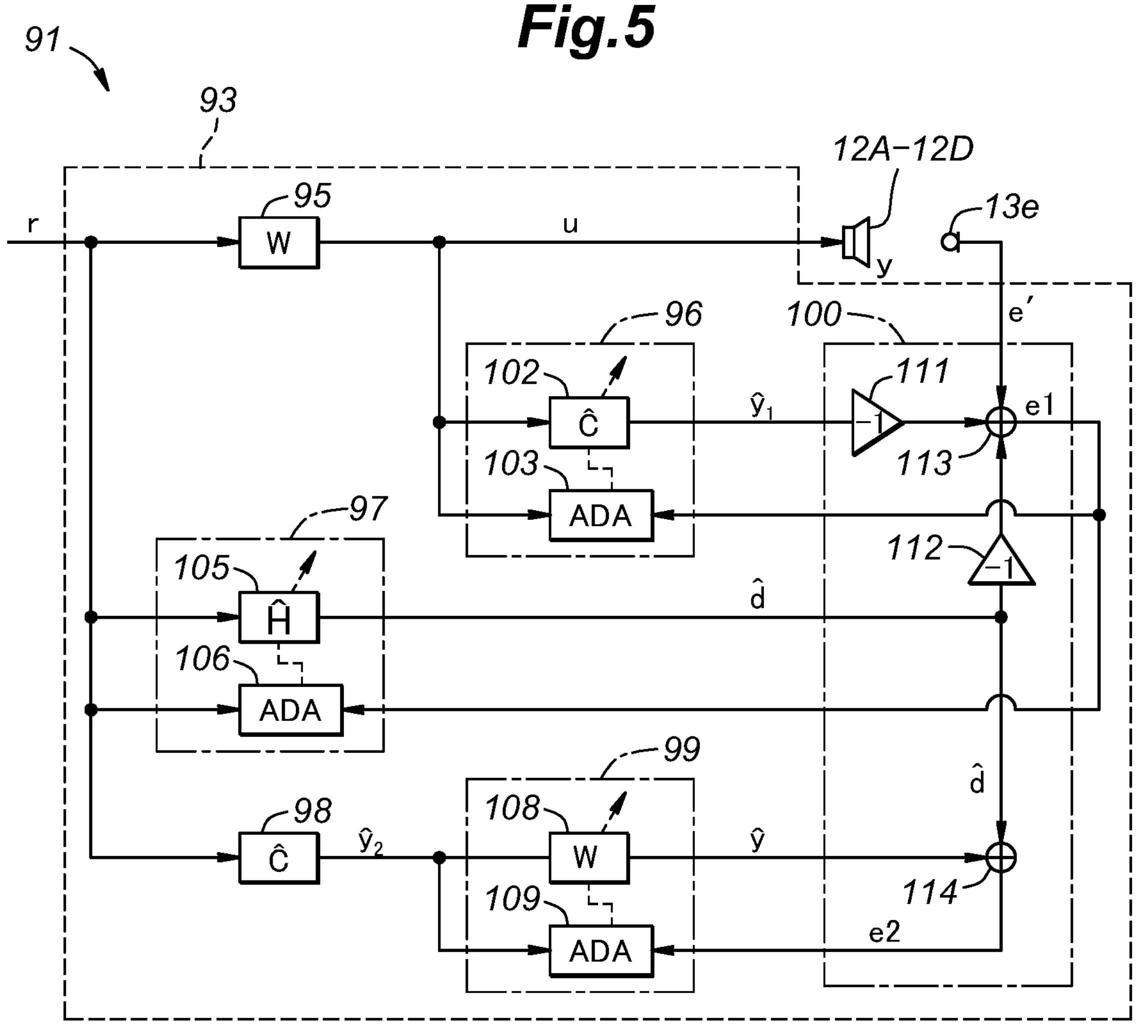
FIG. 5 is a functional block diagram showing a control signal output unit according to the third embodiment.

Next, the third embodiment of the present invention will be described with reference to FIG. 5. The components of the controller 91 other than a control signal output unit 93 are the same as those of the first embodiment. Accordingly, descriptions of these components will be omitted.

<The Control Signal Output Unit 93>

The control signal output unit 93 of the controller 91 includes a control signal generation unit 95, a first canceling estimation signal generation unit 96, a noise estimation signal generation unit 97, a second canceling estimation signal generation unit 98, a control filter update unit 99, and a virtual error signal generation unit 100.

<The Control Signal Generation Unit 95>

The control signal generation unit 95 consists of a control filter W. An FIR filter or a SAN filter may be used for the control filter W. The control signal generation unit 95 generates a control signal u by filtering the correction reference signal r. The control signal generation unit 95 outputs the generated control signal u to the speakers 12A-12D and the first canceling estimation signal generation unit 96.

<The First Canceling Estimation Signal Generation Unit 96>

The first canceling estimation signal generation unit 96 includes a secondary path filter unit 102 and a secondary path update unit 103.

The secondary path filter unit 102 consists of a secondary path filter $\hat{C}$. The secondary path filter $\hat{C}$ is a filter corresponding to an estimation value of the transfer characteristics of the canceling sound y from each speaker 12A-12D to the error microphones 13*e*. An FIR filter or a SAN filter may be used for the secondary path filter $\hat{C}$.

The secondary path filter unit 102 generates a canceling estimation signal $\hat{y}_1$ by filtering the control signal u. The secondary path filter unit 102 outputs the generated canceling estimation signal $\hat{y}_1$ to the virtual error signal generation unit 100.

The secondary path update unit 103 adaptively updates the coefficients of the secondary path filter C^ using an adaptive algorithm such as the LMS algorithm. More specifically, the secondary path update unit 103 updates the coefficients of the secondary path filter C^ such that a virtual error signal e1 (that will be described later) output from the virtual error signal generation unit 100 is minimized.

<The Noise Estimation Signal Generation Unit 97>

The noise estimation signal generation unit 97 includes a primary path filter unit 105 and a primary path update unit 106.

The primary path filter unit 105 consists of a primary path filter H^. The primary path filter H^ is a filter corresponding to an estimation value of the transfer characteristics of the noise d from the noise source to the error microphones 13*e*. An FIR filter or a SAN filter may be used for the primary path filter H^.

The primary path filter unit 105 generates a noise estimation signal d^ by filtering the correction reference signal r. The primary path filter unit 105 outputs the generated noise estimation signal d^ to the virtual error signal generation unit 100.

The primary path update unit 106 adaptively updates coefficients of the primary path filter H^ using an adaptive algorithm such as the LMS algorithm. More specifically, the primary path update unit 106 updates the coefficients of the primary path filter H^ such that the virtual error signal e1 output from the virtual error signal generation unit 100 is minimized.

<The Second Canceling Estimation Signal Generation Unit 98>

The second canceling estimation signal generation unit 98, like the first canceling estimation signal generation unit 96, consists of the secondary path filter C^. When the coefficients of the secondary path filter C^ are updated in the first canceling estimation signal generation unit 96, the updated coefficients of the secondary path filter C^ are output to the second canceling estimation signal generation unit 98, and the coefficients of the secondary path filter C^ are updated in the second canceling estimation signal generation unit 98. That is, the coefficients of the secondary path filter C^ set in the second canceling estimation signal generation unit 98 are not fixed values but values that are successively updated based on the signal from the first canceling estimation signal generation unit 96.

The second canceling estimation signal generation unit 98 generates a canceling estimation signal $y\hat{}_2$ by filtering the correction reference signal r. The second canceling estimation signal generation unit 98 outputs the generated canceling estimation signal $y\hat{}_2$ to the control filter update unit 99.

<The Control Filter Update Unit 99>

The control filter update unit 99 includes a control filter unit 108 and a control update unit 109.

The control filter unit 108, like the control signal generation unit 95, consists of the control filter W. The control filter unit 108 generates a canceling estimation signal y^ by filtering the canceling estimation signal $y\hat{}_2$ output from the second canceling estimation signal generation unit 98. The control filter unit 108 outputs the generated canceling estimation signal y^ to the virtual error signal generation unit 100.

The control update unit 109 updates coefficients of the control filter W using an adaptive algorithm such as the LMS algorithm. More specifically, the control update unit 109 updates the coefficients of the control filter W such that a virtual error signal e2 (that will be described later) output from the virtual error signal generation unit 100 is minimized.

When the coefficients of the control filter W are updated in the control filter update unit 99 in this way, the updated coefficients of the control filter W are output to the control signal generation unit 95, and the coefficients of the control filter W are updated in the control signal generation unit 95. That is, the coefficients of the control filter W set in the control signal generation unit 95 are not fixed values but values that are sequentially updated based on the signal from the control filter update unit 99.

<The Virtual Error Signal Generation Unit 100>

The virtual error signal generation unit 100 includes a first polarity reversing unit 111, a second polarity reversing unit 112, a first adder 113, and a second adder 114.

The first polarity reversing unit 111 reverses the polarity of the canceling estimation signal $y\hat{}_1$ output from the first canceling estimation signal generation unit 96. The second polarity reversing unit 112 reverses the polarity of the noise estimation signal d output from the noise estimation signal generation unit 97.

The first adder 113 generates the virtual error signal e1 by adding together the error signal e', the canceling estimation signal $y\hat{}_1$ that has passed through the first polarity reversing unit 111, and the noise estimation signal d^ that has passed through the second polarity reversing unit 112. The first adder 113 outputs the generated virtual error signal e1 to the first canceling estimation signal generation unit 96 and the noise estimation signal generation unit 97.

The second adder 114 generates a virtual error signal e2 by adding together the noise estimation signal d^ output from the noise estimation signal generation unit 97 and the canceling estimation signal y^ output from the control filter update unit 99. The second adder 114 outputs the generated virtual error signal e2 to the control filter update unit 99.

<The Effect of the Third Embodiment>

The controller 91 adaptively updates the coefficients of the secondary path filter C^, and thus adaptively updates the control filter W based on the updated coefficients of the secondary path filter C^. Accordingly, even if the transfer characteristics C of the canceling sound y from each speaker 12A-12D to the error microphones 13*e* change according to the change in the environment of the error microphones 13*e*, the controller 91 can learn this change and update the control filter W appropriately. Accordingly, the noise d can be reduced more effectively.

<The Modification of the Third Embodiment>

In the third embodiment, the adaptively updated coefficients of the secondary path filter C^ are output only to the second canceling estimation signal generation unit 98. In another embodiment, the adaptively updated coefficients of the secondary path filter C^ may be output to the second secondary path filter unit 41 of the audio signal removal unit 24 (see the first embodiment) as well as the second canceling estimation signal generation unit 98. Accordingly, the audio signal removal unit 24 can generate the correction error signal e based on the adaptively updated coefficients of the secondary path filter C^.

In the third embodiment, the controller 91, to which both the SAN filter and the FIR filter can be applied, updates the coefficients of the control filter W using the adaptively updated coefficients of the secondary path filter C^. In another embodiment, the control signal component generation unit 60 of the controller 53 (see the second embodiment), to which only the SAN filter can be applied, may update the coefficients of the control filter W using the adaptively updated coefficients of the secondary path filter C^.

The Fourth Embodiment

Figure 6:
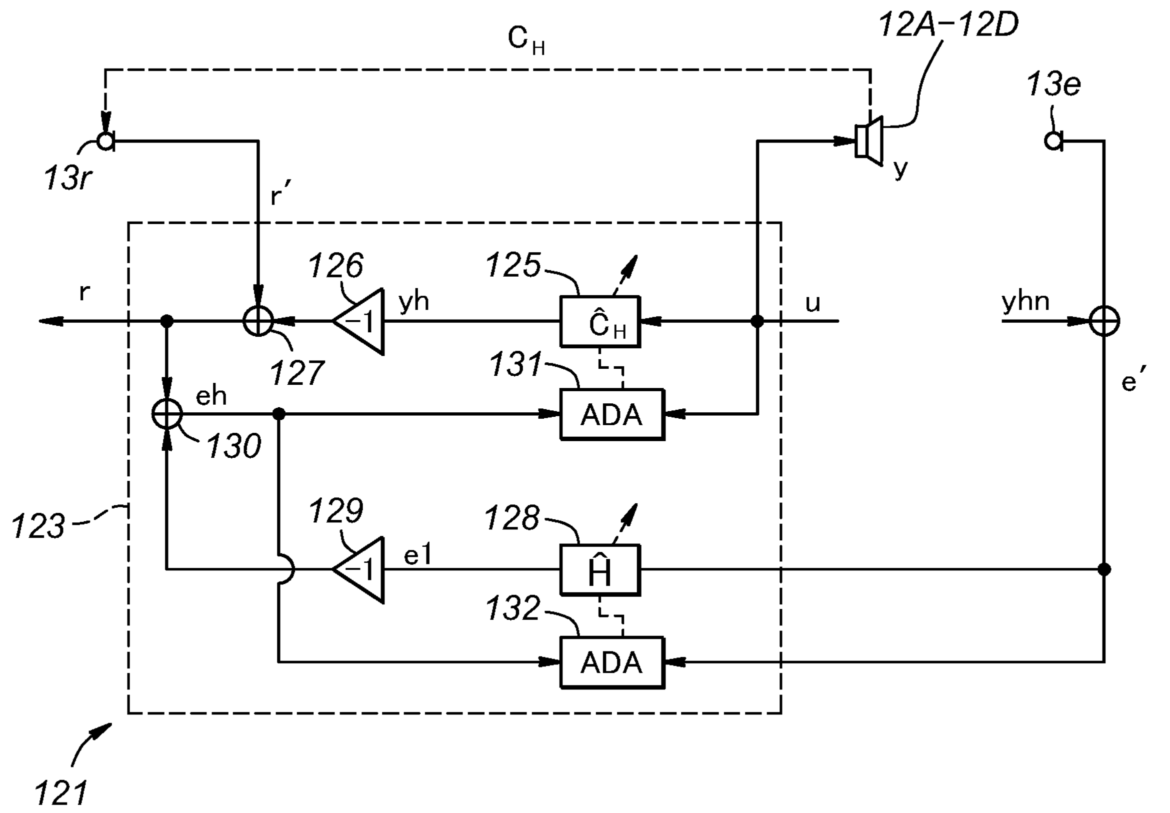
FIG. 6 is a functional block diagram showing a howl removal unit according to the fourth embodiment.

Next, the fourth embodiment of the present invention will be described with reference to FIG. 6. The components of the controller 121 other than the howl removal unit 123 are the same as those of the first embodiment. Accordingly, descriptions of these components will be omitted. A symbol yhn in FIG. 6 indicates a howl signal for the error microphones 13*e*.

<The Howl Removal Unit 123>

The howl removal unit 123 of the controller 121 includes a howl filter unit 125, a first polarity reversing unit 126, a first adder 127, a primary path filter unit 128, a second polarity reversing unit 129, a second adder 130, a howl update unit 131, and a primary path update unit 132. The configurations of the howl filter unit 125, the first polarity reversing unit 126, and the first adder 127 are the same as those of the howl filter unit 31, the polarity reversing unit 32, and the adder 33 according to the first embodiment. Accordingly, descriptions of these components will be omitted.

The primary path filter unit 128 consists of a primary path filter H^. The primary path filter $\hat{H}$ is a filter corresponding to an estimation value of the transfer characteristics of the noise d from the noise source to the error microphones 13*e*. An FIR filter or a SAN filter may be used for the primary path filter H^.

The primary path filter unit 128 generates a virtual error signal e1 by filtering the error signal e'. The primary path filter unit 128 outputs the generated virtual error signal e1 to the second polarity reversing unit 129.

The second polarity reversing unit 129 reverses the polarity of the virtual error signal e1 output from the primary path filter unit 128. The second polarity reversing unit 129 outputs the virtual error signal e1 with a reversed polarity to the second adder 130.

The second adder 130 generates a virtual error signal eh by adding together the correction reference signal r output from the first adder 127 and the virtual error signal e1 that has passed through the second polarity reversing unit 129. The second adder 130 outputs the generated virtual error signal eh to the howl update unit 131 and the primary path update unit 132.

The howl update unit 131 adaptively updates the coefficients of the howl filter $C^{\wedge}_H$ using an adaptive algorithm such as the LMS algorithm. More specifically, the howl update unit 131 updates the coefficients of the howl filter $C^{\wedge}_H$ such that the virtual error signal eh output from the second adder 130 is minimized.

The primary path update unit 132 adaptively updates the coefficients of the primary path filter H^ using an adaptive algorithm such as the LMS algorithm. More specifically, the primary path update unit 132 updates the coefficients of the primary path filter H^ such that the virtual error signal eh output from the second adder 130 is minimized.

<The Effect of the Fourth Embodiment>

The controller 121 adaptively updates the coefficients of the howl filter $C^{\wedge}_H$ and removes the component of the canceling sound y from the reference signal r' based on the updated coefficients of the howl filter $C^{\wedge}_H$. Accordingly, even when the transfer characteristics $C_H$ of the canceling sound y from each speaker 12A-12D to the reference microphones 13*r* change according to the change in the environment of the reference microphones 13*r*, the controller 121 can learn this change and appropriately remove the component of the canceling sound y from the reference signal r'. Accordingly, the noise d can be reduced more effectively.

The Fifth Embodiment

Next, the fifth embodiment of the present invention will be described with reference to FIGS. 7-9. The explanations that overlap with those of the first embodiment of the present invention will be omitted as appropriate.

<The Active Noise Reduction System 141>

Figure 7:
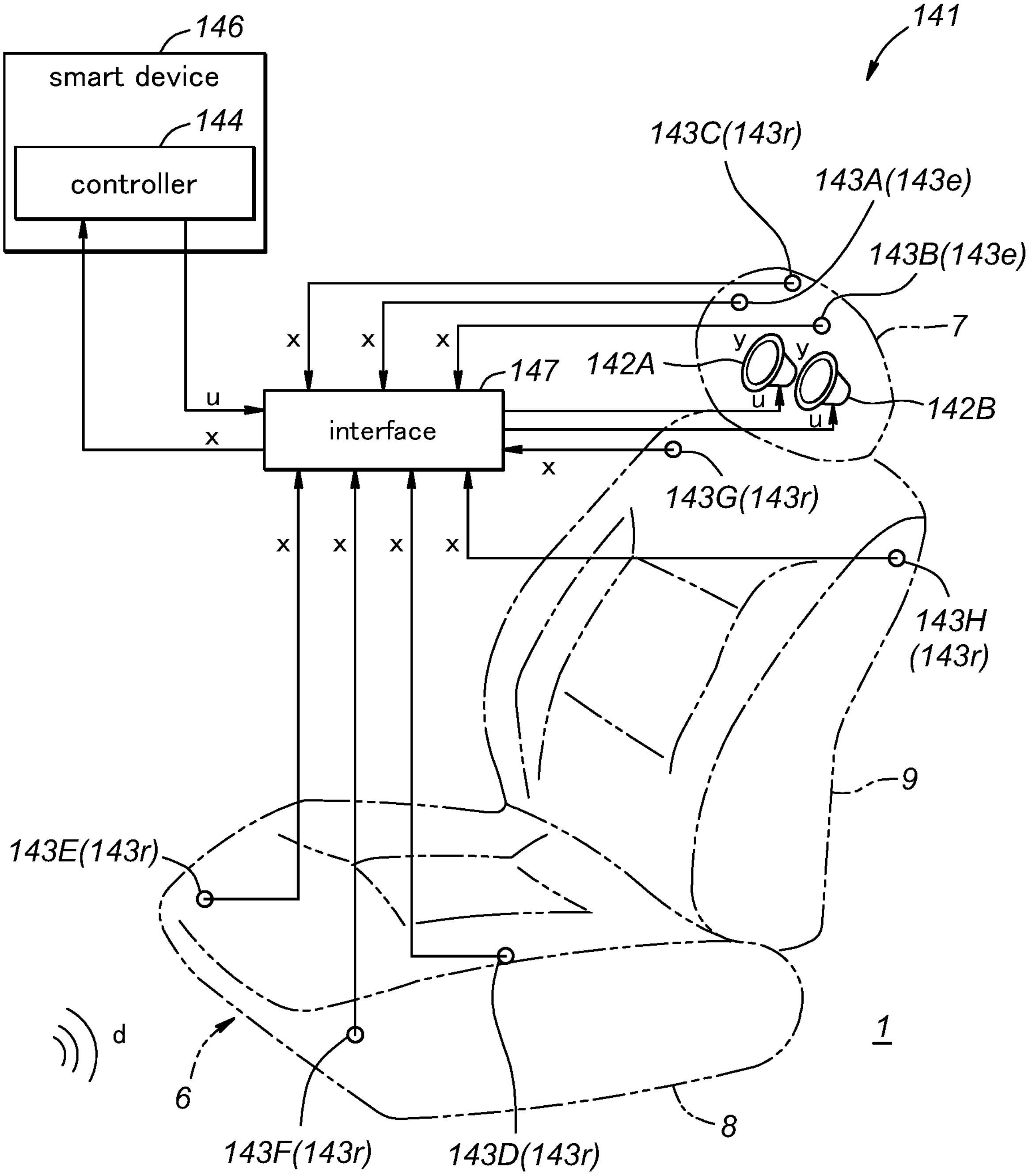
FIG. 7 is a schematic diagram showing an active noise reduction system according to the fifth embodiment.

With reference to FIG. 7, an active noise reduction system 141 (hereinafter abbreviated as "noise reduction system 141") includes a pair of speakers 142A, 142B (an example of a canceling sound output device) configured to output the canceling sound y for canceling the noise d, a plurality of noise microphones 143A-143H configured to generate a plurality of noise signals x based on a noise d, and a controller 144 configured to control a plurality of speakers 142A, 142B based on the plurality of noise signals x.

<The Speakers 142A, 142B>

The speakers 142A, 142B of the noise reduction system 141 are arranged in an occupant seat 6 of the vehicle 1. More specifically, the speakers 142A, 142B are arranged on both lateral sides of a headrest 7 of the occupant seat 6 to reduce the noise d at a head position of an occupant.

<The Noise Microphones 143A-143H>

The noise microphones 143A-143H of the noise reduction system 141 are arranged in the occupant seat 6 of the vehicle 1. More specifically, the noise microphones 143A, 143B are arranged on both lateral sides of the headrest 7 to detect the noise d at left and right ear positions of the occupant. For example, the noise microphones 143A, 143B are used as error microphones 143*e*. The noise microphone 143C is arranged at an upper end of the headrest 7 to detect noise d from above the occupant. The noise microphone 143D is arranged on a lower surface of a seat cushion 8 of the occupant seat 6 to detect the noise d from below the occupant. The noise microphones 143E, 143F are arranged at a left front portion and a right front portion of the seat cushion 8 to detect the noise d from a lower left front side and a lower right front side of the occupant. The noise microphones 143G, 143H are arranged in an upper left portion and an upper right portion of a seat back 9 of the occupant seat 6 so as to detect the noise d from both lateral sides of the occupant. For example, the noise microphones 143C-143H are used as reference microphones 143*r*.

<The Controller 144>

The controller 144 is installed in a smart device 146 (an example of a portable terminal) configured to be taken outside a vehicle 1. More specifically, the controller 144 is realized by an active noise reduction program (active noise reduction application) executed on an OS of the smart device 146. The smart device 146 consists of a smart phone, for example.

The controller 144 is connected to an interface 147 provided in the vehicle 1, and is connected to the speakers 142A, 142B and the noise microphones 143A-143H via the interface 147. The interface 147 may be a wired interface such as USB, or a wireless interface such as Bluetooth™.

Although illustration is omitted, the controller 144 has the similar configuration as the controller 16 according to the first embodiment. However, the controller 144 includes the control signal output unit 93 of the controller 91 according to the third embodiment instead of the control signal output unit 23 of the controller 16 according to the first embodiment. Further, the controller 144 includes the howl removal unit 123 of the controller 121 according to the fourth embodiment instead of the howl removal unit 22 of the controller 16 according to the first embodiment.

<The Action of the Noise Reduction System 141>

Figure 8:
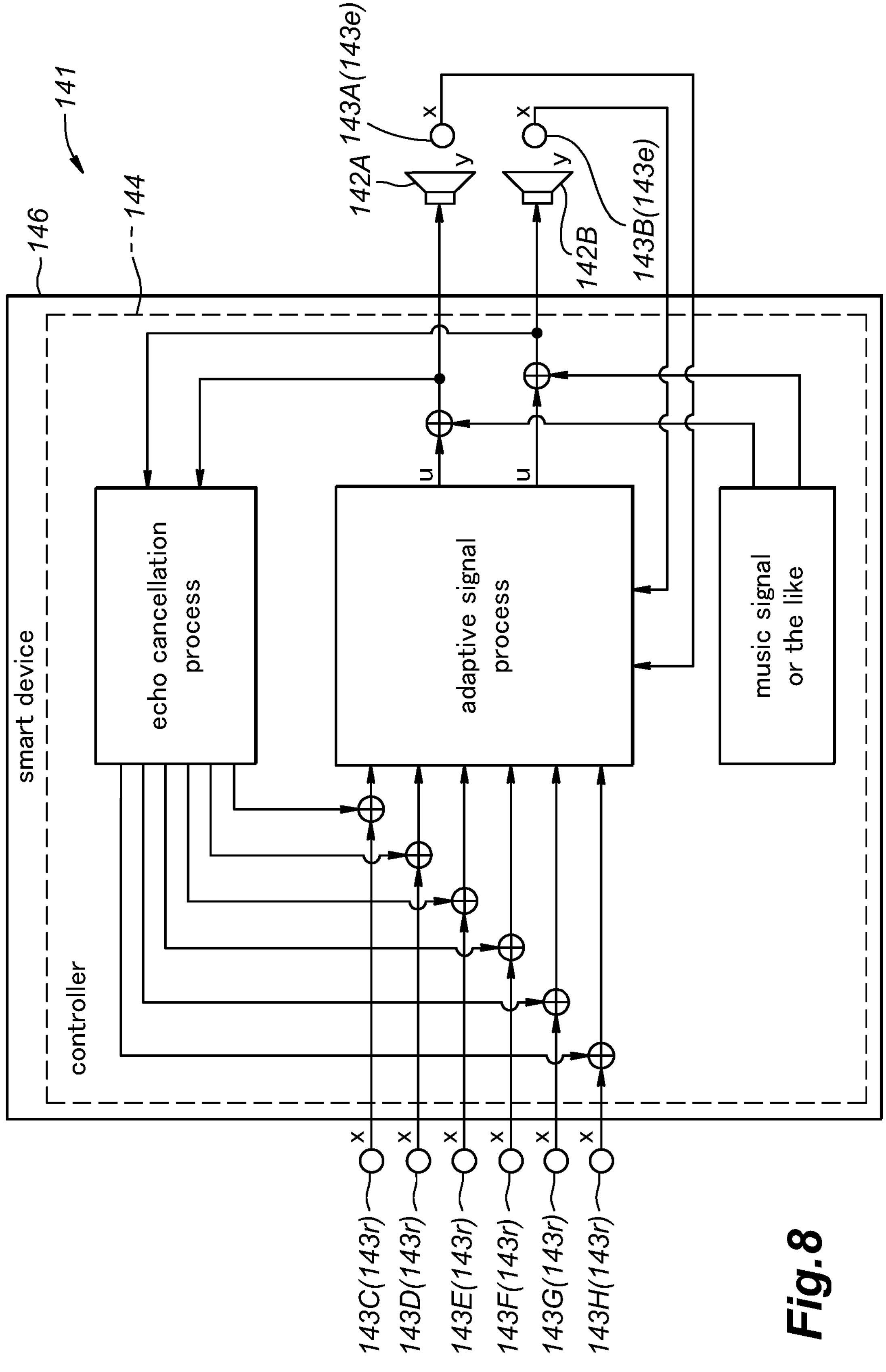
FIG. 8 is a functional block diagram showing the active noise reduction system according to the fifth embodiment.
Figure 9:
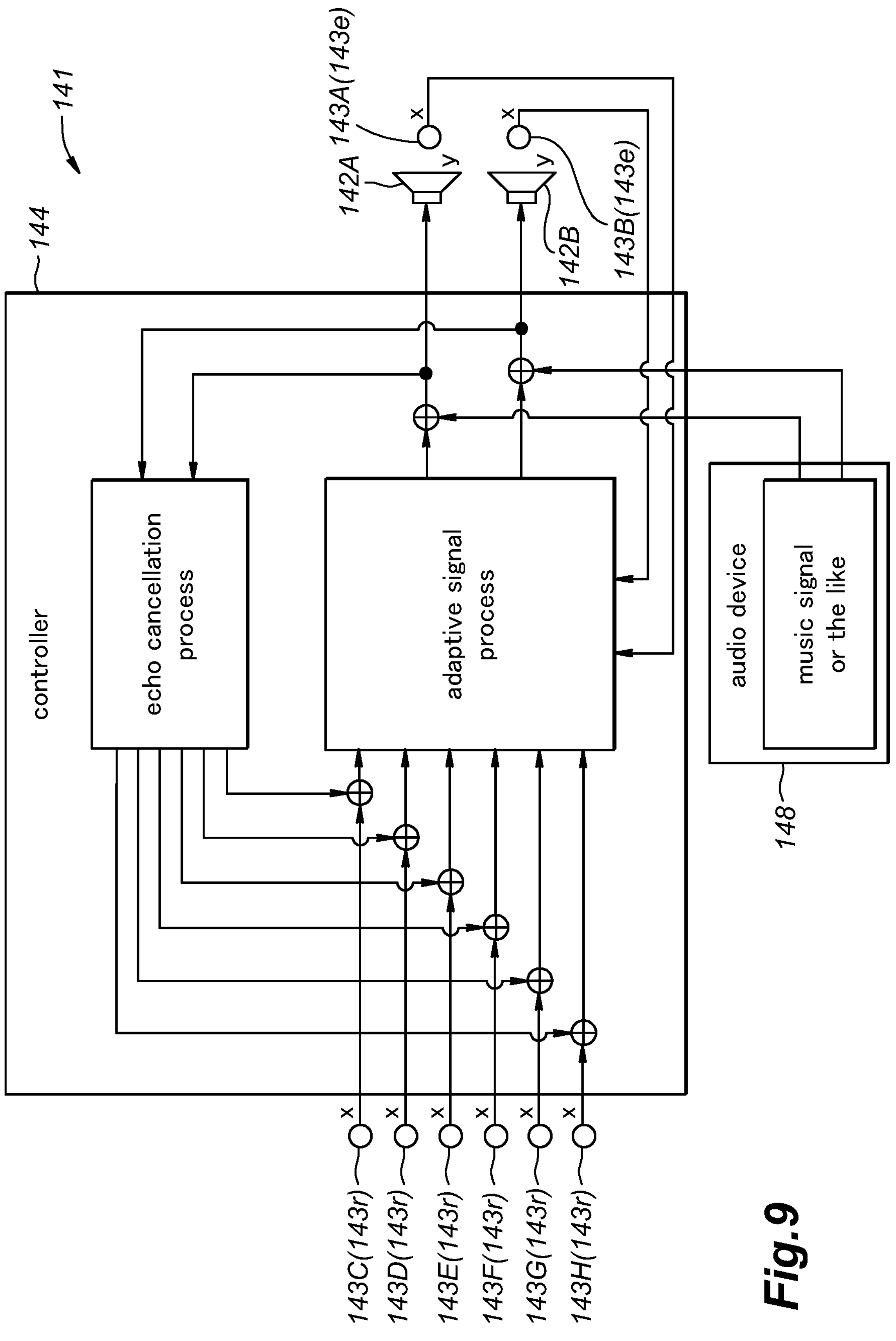
FIG. 9 is a functional block diagram showing an active noise reduction system according to a modification of the fifth embodiment.

With reference to FIG. 8, the noise signals x output from the noise microphones 143A-143H are input to the controller 144 as multi-channel digital signals. Similarly, the control signals u output from the controller 144 are input to the speakers 142A, 142B as multi-channel digital signals. At that time, the control signals u are input to the speakers 142A, 142B of the occupant seat 6 together with a music signal generated by the controller 144. Accordingly, the speakers 142A, 142B output the canceling sound y together with the music selected by the occupant. Accordingly, the occupant can receive the effect of reducing the noise by the noise reduction system 141 while enjoying the music the occupant has selected.

By the way, the canceling sound y and music output from the speakers 142A, 142B reach not only the error microphones 143*e* but also the reference microphones 143*r*. Accordingly, the controller 144 executes an echo cancellation process for canceling echoes due to the canceling sound y and music. Such an echo cancellation process is realized by the howl removal unit 123 (see the fourth embodiment) of the controller 144.

Further, when a front-and-rear position of the occupant seat 6 and the inclination of the seat back 9 change, the transfer characteristics C of the canceling sound y from each speaker 142A, 142B to the error microphones 143*e* also change. As such, the controller 144 executes an adaptive signal process (sound field learning process) for learning the transfer characteristics C. The adaptive signal process for learning the transfer characteristics C is realized by the control signal output unit 93 of the controller 144 (see the third embodiment).

Furthermore, when the front-and-rear position of the occupant seat 6 and the inclination of the seat back 9 change, the transfer characteristics $C_H$ of the canceling sound y from each speaker 142A, 142B to the reference microphones 143*r* also change. As such, the controller 144 executes an adaptive signal process (sound field learning process) for learning the transfer characteristics $C_H$. The adaptive signal process for learning the transfer characteristics $C_H$ is realized by the howl removal unit 123 (see the fourth embodiment) of the controller 144.

<The Effect of the Fifth Embodiment>

The speakers 142A, 142B and the plurality of noise microphones 143A-143H are all installed in the single occupant seat 6 of the vehicle 1, and the controller 144 is installed in the smart device 146 configured to be taken outside the vehicle 1. Thus, the noise reduction system 141 can consist of the single occupant seat 6 and the smart device 146.

<The Modification of the Fifth Embodiment>

In the fifth embodiment, the controller 144 installed in the smart device 146 generates a music signal by itself. As shown in FIG. 9, if the controller 144 consists of a dedicated ECU for the noise reduction system 141, an audio device 148 provided separately from the controller 144 may output the music signal to the controller 144.

In the fifth embodiment, only the noise signals x output from the noise microphones 143C-143H installed in the occupant seat 6 are used as the reference signals. In another embodiment, in addition to the noise signals x output from the noise microphones 143C-143H, a vibration signal corresponding to the vibration of each portion of the vehicle body may be used as the reference signals.

Concrete embodiments of the present invention have been described in the foregoing, but the present invention should not be limited by the foregoing embodiments and various modifications and alterations are possible within the scope of the present invention.

The invention claimed is:

1. An active noise reduction system, comprising:
- a canceling sound output device configured to output a canceling sound for canceling a noise;
- a plurality of noise microphones configured to generate a plurality of noise signals based on the noise; and
- a controller configured to control the canceling sound output device based on the plurality of noise signals,
- wherein the controller is configured to:
- acquire the plurality of noise signals output from the plurality of noise microphones;
- select a reference signal and an error signal from among the plurality of noise signals, the reference signal corresponding to the noise, the error signal corresponding to an error between the noise and the canceling sound;
- generate a correction reference signal by removing a component of the canceling sound from the reference signal; and
- generate a control signal based on the correction reference signal, the control signal being a signal for controlling the canceling sound output device.

2. The active noise reduction system according to claim 1, wherein the controller is configured to:
- extract components of the correction reference signal at a plurality of frequencies by using a plurality of extraction filters;
- generate components of the control signal at the plurality of frequencies from the components of the correction reference signal at the plurality of frequencies by using a plurality of control filters; and
- generate the control signal by adding together the components of the control signal at the plurality of frequencies.

3. The active noise reduction system according to claim 2, wherein the plurality of extraction filters and the plurality of control filters are composed of adaptive notch filters.

4. The active noise reduction system according to claim 1, wherein the controller is configured to:
- acquire an audio signal output from an audio source;
- generate a correction error signal by removing a component of the audio signal from the error signal; and
- adaptively update a control filter based on the correction error signal, the control filter being a filter for generating the control signal.

5. The active noise reduction system according to claim 4, wherein the plurality of noise microphones includes a reference microphone configured to generate the reference signal and an error microphone configured to generate the error signal, and
- the controller is configured to:
- adaptively update an estimation value of transfer characteristics from the canceling sound output device to the error microphone; and
- generate the correction error signal based on the updated estimation value of the transfer characteristics from the canceling sound output device to the error microphone.

6. The active noise reduction system according to claim 1, wherein the plurality of noise microphones includes a reference microphone configured to generate the reference signal and an error microphone configured to generate the error signal, and the controller is configured to:

adaptively update an estimation value of transfer characteristics from the canceling sound output device to the error microphone; and adaptively update a control filter based on the updated estimation value of the transfer characteristics from the canceling sound output device to the error microphone, the control filter being a filter for generating the control signal.

7. The active noise reduction system according to claim 1, wherein the plurality of noise microphones includes a reference microphone configured to generate the reference signal and an error microphone configured to generate the error signal, and the controller is configured to:

adaptively update an estimation value of transfer characteristics from the canceling sound output device to the reference microphone; and remove the component of the canceling sound from the reference signal based on the updated estimation value of the transfer characteristics from the canceling sound output device to the reference microphone.

8. The active noise reduction system according to claim 1, wherein the canceling sound output device and the plurality of noise microphones are arranged in an occupant seat of a vehicle, and the controller is installed in a portable terminal configured to be taken outside the vehicle.

9. An active noise reduction method, comprising:

acquiring a plurality of noise signals output from a plurality of noise microphones;

selecting a reference signal and an error signal from among the plurality of noise signals, the reference signal corresponding to a noise, the error signal corresponding to an error between the noise and a canceling sound;

generating a correction reference signal by removing a component of the canceling sound from the reference signal; and generating a control signal based on the correction reference signal, the control signal being a signal for controlling the canceling sound.

10. A non-transitory computer-readable storage medium comprising an active noise reduction program, wherein the active noise reduction program, when executed by a processor, executes an active noise reduction method comprising:

acquiring a plurality of noise signals output from a plurality of noise microphones;

selecting a reference signal and an error signal from among the plurality of noise signals, the reference signal corresponding to a noise, the error signal corresponding to an error between the noise and a canceling sound;

generating a correction reference signal by removing a component of the canceling sound from the reference signal; and generating a control signal based on the correction reference signal, the control signal being a signal for controlling the canceling sound.

* * * * *